US012632906B2

(12) United States Patent
Dailey et al.

(10) Patent No.: US 12,632,906 B2
(45) Date of Patent: May 19, 2026

(54) AUTOGENERATE INTERVIEW TOPICS

(71) Applicant: INTUIT INC., Mountain View, CA (US)

(72) Inventors: James Dailey, Mountain View, CA (US); Adam Neeley, Mountain View, CA (US); Martin G. Lewandowski, Mountain View, CA (US); Ketan Reddy, Mountain View, CA (US); Jennifer L. Keenan, Mountain View, CA (US); Adam Christopher Dierkens, Mountain View, CA (US); Rafael Campos, Mountain View, CA (US); Chetan Desai, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 10 days.

(21) Appl. No.: 18/674,741

(22) Filed: May 24, 2024

(65) Prior Publication Data

US 2025/0363567 A1 Nov. 27, 2025

(51) Int. Cl.
G06F 40/20 (2020.01)
G06F 9/451 (2018.01)
G06Q 40/12 (2023.01)

(52) U.S. Cl.
CPC .......... G06Q 40/123 (2013.12); G06F 9/451 (2018.02); G06F 40/20 (2020.01)

(58) Field of Classification Search
None
See application file for complete search history.

(56) References Cited

U.S. PATENT DOCUMENTS

| | | | | | |
|---|---|---|---|---|---|
| 7,539,635 | B1 * | 5/2009 | Peak | ...................... | G06Q 10/00 |
| | | | | | 705/31 |
| 2006/0112114 | A1 * | 5/2006 | Yu | .......................... | G06Q 40/10 |
| 2006/0242261 | A1 * | 10/2006 | Piot | ........................ | G06Q 90/00 |
| | | | | | 709/217 |
| 2008/0059900 | A1 * | 3/2008 | Murray | .................. | G06Q 50/26 |
| | | | | | 715/777 |
| 2008/0147462 | A1 * | 6/2008 | Muller | ............ | G06Q 10/06311 |
| | | | | | 705/7.11 |
| 2012/0109792 | A1 * | 5/2012 | Eftekhari | ............ | G06Q 40/123 |
| | | | | | 726/19 |
| 2013/0218735 | A1 * | 8/2013 | Murray | ................ | G06Q 40/123 |
| | | | | | 705/31 |

(Continued)

*Primary Examiner* — William J Jacob

(74) *Attorney, Agent, or Firm* — DLA PIPER LLP US

(57) ABSTRACT

A system for automating creation of an interview experience for document preparation. The system creates a completeness graph by interpreting current rules for the document preparation, the completeness graph indicates informational elements for completing the document preparation. A guide generator creates a field guide using data from the completeness graph including questions to pose to a user for requesting user input for the informational elements for completing the document preparation. An autogenerating process generates the interview experience using the completeness graph and the field guide, and automatically updates a user interface code and a resultant user interface screen displayed to the user in response to modifications to the completeness graph and the field guide.

20 Claims, 5 Drawing Sheets

(56) References Cited

U.S. PATENT DOCUMENTS

| | | | |
|---|---|---|---|
| 2014/0244457 A1* | 8/2014 | Howell | G06Q 40/02 |
| | | | 705/31 |
| 2016/0247239 A1* | 8/2016 | Houseworth | G06Q 40/123 |
| 2017/0061548 A1* | 3/2017 | Roebuck | G06Q 40/123 |
| 2017/0228828 A1* | 8/2017 | Hochberg | G06Q 40/123 |
| 2018/0285757 A1* | 10/2018 | Roebuck | G06N 5/022 |
| 2019/0114593 A1* | 4/2019 | Champaneria | G06F 16/3326 |

* cited by examiner

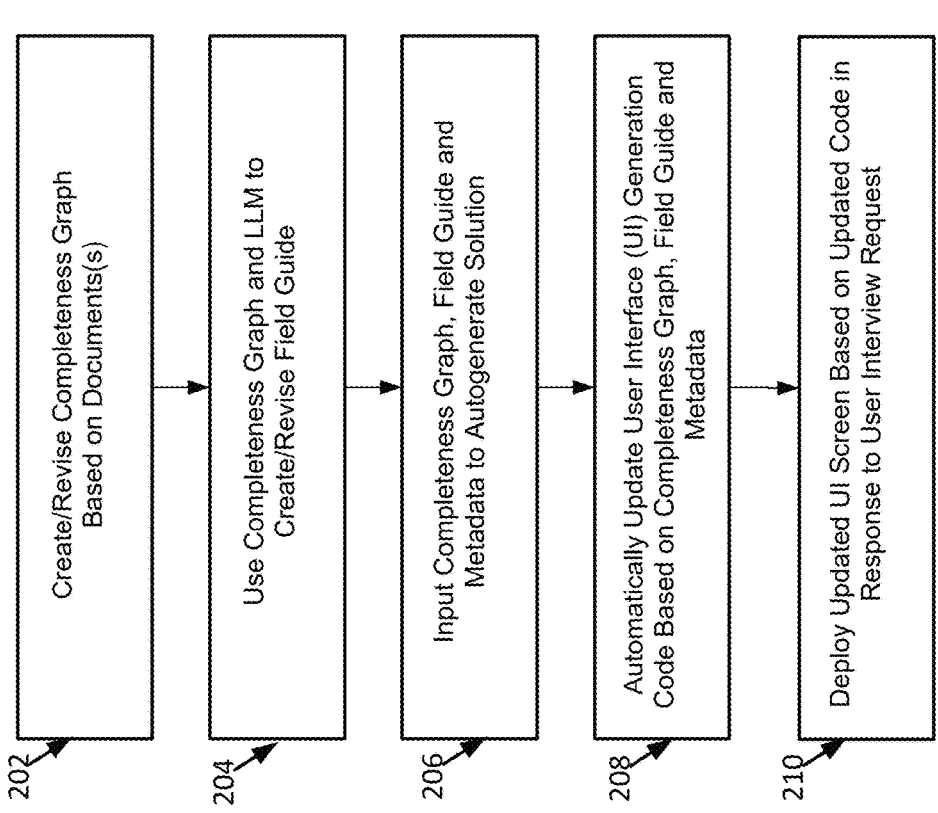

202 — Create/Revise Completeness Graph Based on Documents(s)

204 — Use Completeness Graph and LLM to Create/Revise Field Guide

206 — Input Completeness Graph, Field Guide and Metadata to Autogenerate Solution 208 — Automatically Update User Interface (UI) Generation Code Based on Completeness Graph, Field Guide and Metadata 210 — Deploy Updated UI Screen Based on Updated Code in Response to User Interview Request

300

302 → Determine Desired Informational Elements of the Interview Based on the Knowledge Graph 304 → Determine Interview Questions Based on the Field Guide 306 → Determine Visual Elements of UI Experience Based on Metadata 308 → Create/Revise User Interface (UI) Generation Code Based on the Determined Informational Elements, Interview Questions and Visual Elements

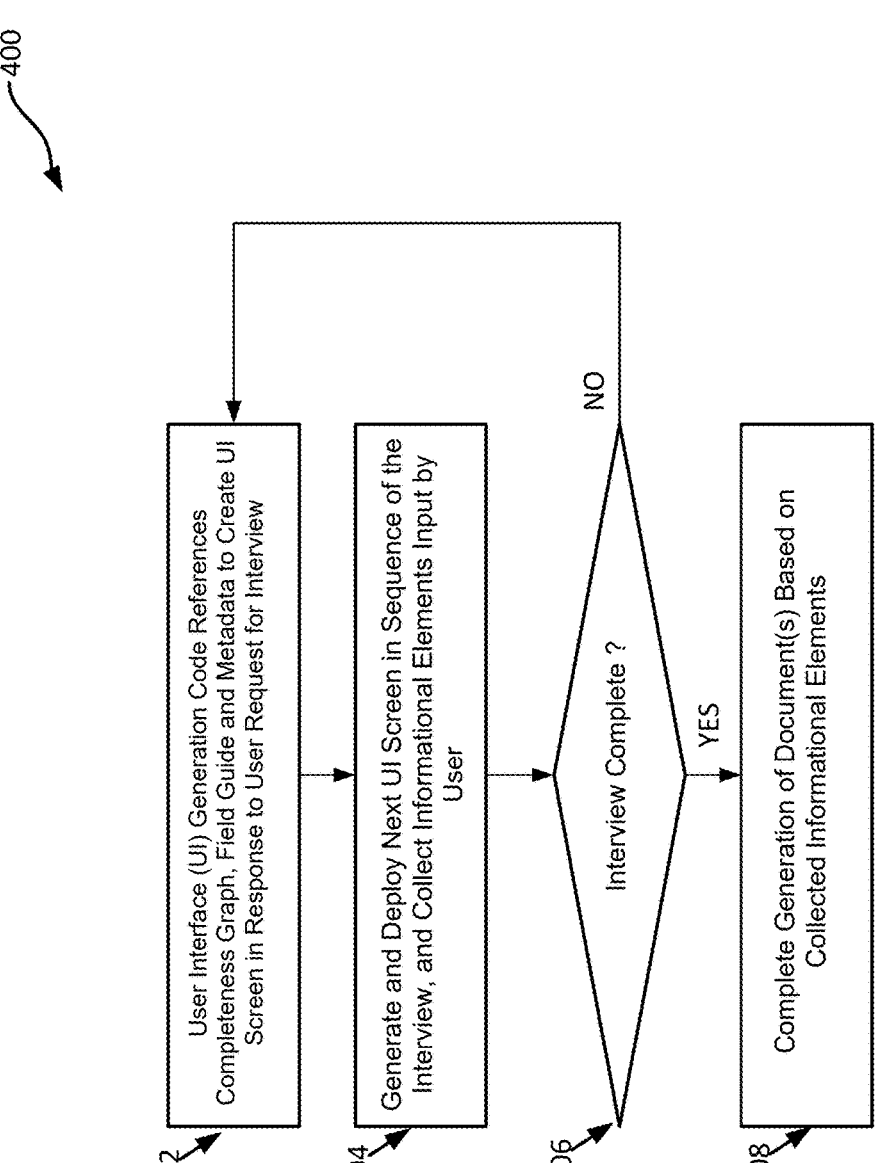

400

402    User Interface (UI) Generation Code References Completeness Graph, Field Guide and Metadata to Create UI Screen in Response to User Request for Interview 404    Generate and Deploy Next UI Screen in Sequence of the Interview, and Collect Informational Elements Input by User 406    Interview Complete ?

NO

YES

408    Complete Generation of Document(s) Based on Collected Informational Elements

Processor(s)

504

Input Device(s)

506

Display Device(s)

508

Network Interface(s)

512

510

514 — Operating System

516 — Network Communication

518 — Applications

AUTOGENERATE INTERVIEW TOPICS

BACKGROUND

In the realm of document preparation (e.g., tax document preparation), the process of updating tax software to reflect changes in tax forms and laws has traditionally been a manual and labor-intensive task. When tax forms are updated by an entity, such as a state tax department, to require different information, a programmer typically has to manually edit the tax preparation software code. This not just involves updating the code to reflect the new information requested by the tax form, but also entails modifying the user interface code to ensure that the software prompts the user for the correct information. This process can be time-consuming and prone to errors, particularly given the complexity of tax laws and the frequency with which they can change.

Despite the advancements in technology, the process of updating tax software has remained largely manual, with limited automation. Existing systems within the industry, including those used by competitors, involve a human analyst interpreting changes in tax laws, creating requirements for an interview topic based on the updated tax form, and then coding these requirements into a user-friendly interview screen. This manual interpretation and implementation process can be inefficient and can lead to delays in updating the software to reflect the latest tax laws and forms. Furthermore, the process of creating an interview layer for customers, particularly for online customers, can be a complex and resource-intensive task, requiring a high level of expertise and a deep understanding of tax laws and regulations.

SUMMARY

Embodiments disclosed herein solve the aforementioned technical problems and may provide other technical solutions as well. Contrary to conventional techniques, the disclosed solution includes a novel method of instruction optimization that focuses on optimizing a soft prompt, i.e., text embeddings, using gradient-free methods, and decoding the optimized soft prompt back to discrete text using invertible embedding models. The disclosed solution further enhances efficiency by reducing the dimension of the embedding space to a low-dimensional manifold, a novel approach that makes Bayesian optimization feasible to achieve high performance more efficiently.

A system for automating creation of an interview experience for document preparation is provided. In one or more embodiments, the system comprises a completeness graph generator configured to create a completeness graph by interpreting current rules for the document preparation, the completeness graph indicating informational elements for completing the document preparation, a field guide generator configured to create a field guide using data from the completeness graph, the field guide aligned with the completeness graph and including questions to pose to a user for requesting user input for the informational elements for completing the document preparation, and an autogenerating process configured to generate the interview experience using the completeness graph and the field guide, the autogenerating process automatically updating a user interface code and a resultant user interface screen displayed to the user in response to modifications to the completeness graph and the field guide.

A method for automating creation of an interview experience for document preparation is provided. In one or more embodiments, the method comprises creating, by a completeness graph generator, a completeness graph by interpreting current rules for the document preparation, the completeness graph indicating informational elements for completing the document preparation, creating, by a field guide generator, a field guide using data from the completeness graph, the field guide aligned with the completeness graph and including questions to pose to a user for requesting user input for the informational elements for completing the document preparation, and generating, by an autogenerating process, the interview experience using the completeness graph and the field guide, the autogenerating process automatically updating a user interface code and a resultant user interface screen displayed to the user in response to modifications to the completeness graph and the field guide.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 2 is a flowchart outlining an example process for updating a user interface based on tax form changes, according to aspects of the present disclosure.

FIG. 4 is a flowchart of an example Interview UI Generation Process, according to aspects of the present disclosure.

DETAILED DESCRIPTION OF SEVERAL EMBODIMENTS

Figure 1:
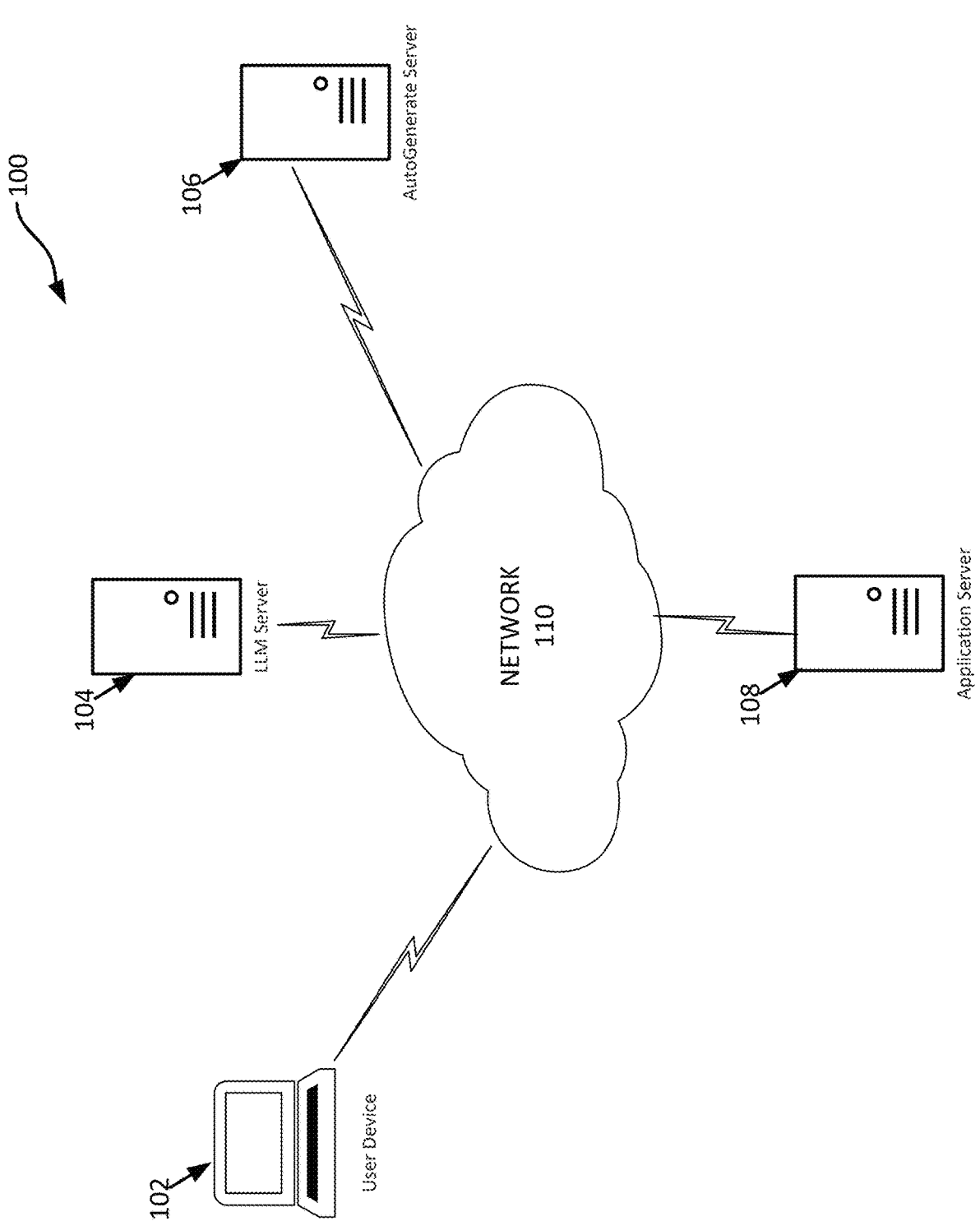
FIG. 1 is a block diagram of an automated document preparation system, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatuses as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. It is noted that similar reference numerals and letters refer to similar items in the figures, and once an item is defined for one figure, it is possible that it need not be further discussed for the other figures.

In the business domain of document preparation, there has been a notable absence of a comprehensive interview system tailored for desktop users. The focus is shifting towards catering to an online clientele that necessitates a robust interview mechanism. The solution presented herein is designed to facilitate the development of the interview process in approximately 40% less time than traditional manual methods would require in the initial year. With subsequent iterations, this technology is poised to streamline the creation of new interviews, supplant existing interview maintenance with yearly generative updates, and transition to a more advanced interview system, all while capturing the full potential market without the necessitation for increased staffing.

The solution creates a dataset known as a completeness graph through automated processes to analyze current content data (e.g., tax data), such as calculations and primary tools. Through automation, the solution refines this completeness graph by removing any superfluous values. Additionally, the solution constructs a separate dataset referred to herein as the field guide, also through automated means. This field guide is then integrated with a language model to ensure it is in sync with the completeness graph. By combining the completeness graph with the language model, the solution is able to automatically generate an interview experience that facilitates the document preparation process. The solution presents an approach to fully automated document preparation experiences. It builds upon existing functionalities, such as the completeness graph and field guide, and introduces innovations that enable these components to work in concert. This synergy results in the creation of an interview screen without the traditional requirements for manual screen implementation or the human interpretation of form changes into interview format.

More specifically, the present disclosure relates to a system and method for automating the creation of an interview experience for document preparation, for example, in the context of tax preparation. The disclosed system and method leverage automation and artificial intelligence to streamline the process of updating tax preparation software in response to changes in tax forms or laws. This is achieved through the creation and utilization of a completeness graph and a field guide, which are used to automatically generate an interview experience and update the user interface of the tax preparation software.

The benefits of the disclosed system and method are numerous. By automating the process of updating tax preparation software, the system and method can reduce the workload on programmers, who would otherwise have to manually edit the software code and user interface. This can result in a more efficient and cost-effective process for maintaining and updating tax preparation software. Furthermore, by using a completeness graph and a field guide to generate an interview experience, the system and method can provide a more user-friendly and intuitive interface for users of the tax preparation software.

Consider, for example, a scenario where a tax form is updated to no longer require the middle name of the filer. In a conventional system, a programmer would have to manually edit the tax preparation software code to remove the middle name field, and also update the user interface to reflect this change. However, with the disclosed system and method, the programmer would simply update the completeness graph to remove the middle name attribute. The system would then automatically update the field guide, generate a new interview experience that no longer includes prompts for the middle name, and update the user interface accordingly. This not only saves time and effort for the programmer, but also ensures that the user interface is consistently updated to reflect the latest requirements of the tax form.

While the description describes the solution in view of a tax document preparation use case, it should be noted that the disclosed system and method are not limited to this application. The principles and mechanisms of the automated user interface generation and interview experience creation are broadly applicable to a wide range of document preparation scenarios. For instance, the system could be adapted for use in legal document preparation, such as the generation of contracts or wills, where changes in legal requirements could be seamlessly integrated into the document preparation software. Similarly, the system could be employed in the healthcare industry to update patient intake forms in response to new medical regulations or insurance requirements. In the field of human resources, the system could automate the creation of employment application forms, ensuring compliance with evolving labor laws. These examples illustrate the versatility of the system and method, which can be applied to any domain where document preparation is subject to frequent updates and legal compliance.

Referring to FIG. 1, an embodiment of an automated document preparation system 100 is depicted. The automated document preparation system 100 may include a user device 102, a large language model (LLM) server 104, an interview autogeneration server 106, and application server 108, interconnected via a communication network 110. The user device 102 may interact with the other components of the automated document preparation system 100 via the communication network 110, which may serve as a medium for data exchange.

The LLM server 104 may process natural language data and communicate with the interview autogeneration server 106 to facilitate the creation of an interview experience. In some cases, the LLM server 104 may use a specialized LLM such as a tax-specific LLM to interpret and analyze the legal language used in tax laws and regulations. This information can be used to enhance the completeness graph, providing a comprehensive document preparation guidance to the user. In some aspects, the LLM server 104 may be configured to create localized framing of a document-specific topic, presenting, for example, tax information in a way that is tailored to the user's specific location and tax laws. The LLM server 104 may also use a natural language model to generate 'help' content for specific document topics, including, for example, explanations, definitions, or instructions related to a particular tax topic.

The application server 108 may manage document-related (e.g. tax-related) calculations and data, which are part of the document preparation process. For example, the application server 108 may be capable of interpreting current tax calculations into a completeness graph with minimum elements on a tax form.

The interview autogeneration server 106 may utilize inputs from both the language model server 104 and the application server 108 to autogenerate user interfaces for document (e.g. tax) filing purposes. In some cases, the interview autogeneration server 106 may be configured to generate the interview experience by using a legal language model to interpret and analyze document preparation legal language of laws and regulations, providing document preparation guidance that is consistent with the legal language of the laws and the regulations. In other cases, the Interview autogeneration server 106 may be configured to update the user interface code and the resultant user interface screen based on changes in document preparation forms (e.g., publicly available forms such as tax forms), such that the user interface reflects current requirements of the forms. The interview autogeneration server 106 may also be configured to deploy the updated user interface screen to the user upon execution of the interview experience for the document preparation, with the updated user interface screen reflecting the updated user interface code and providing an updated interview experience that aligns with the updated documents used in the document preparation.

In some variations, the interview autogeneration server 106 may be configured to update the user interface code in response to updates in the completeness graph and the field guide, with the updates in the completeness graph and the field guide being triggered by changes in the documents used in the document preparation. The interview autogeneration server 106 may also be configured to update the user interface code by removing, adding, or modifying user interface elements corresponding to the informational elements in the completeness graph that have been updated, thereby reflecting the changes in the documents used in the document preparation.

Figure 3:
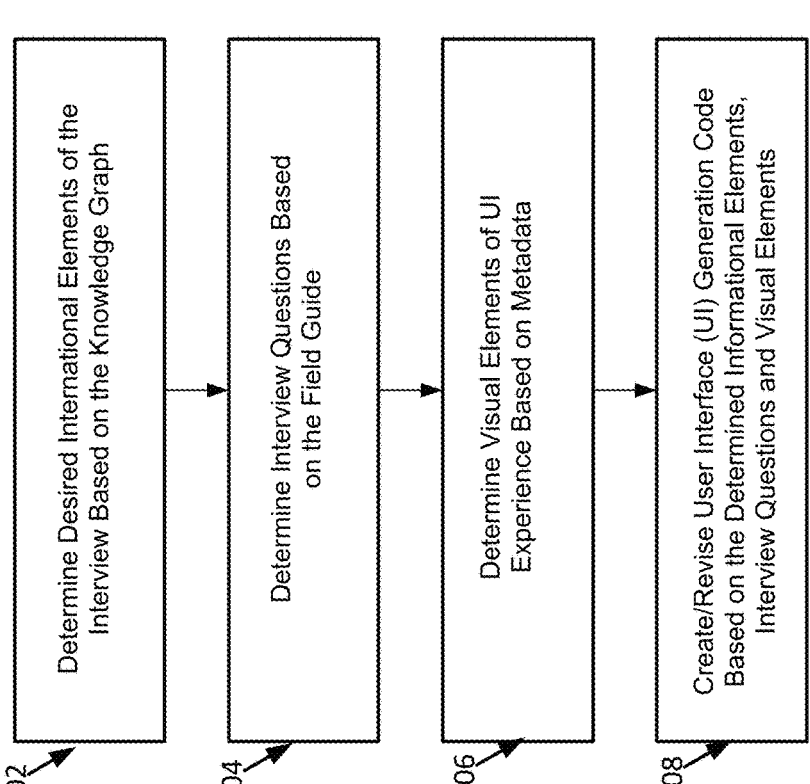
FIG. 3 is a flowchart outlining an example process for generating a user interface for an interview experience, according to aspects of the present disclosure.

Having established the foundational concepts of the automated document preparation system, we will now delve into the specifics of the processes that underpin the dynamic updating of the user interface and the generation of the interview experience. FIGS. 2, 3 and 4 provide a visual representation of examples of these processes, illustrating the flow and interconnectivity of the steps involved.

Also, while the methods depicted in FIGS. 2, 3, and 4 are described with respect to the user interface of tax document preparation software, it is noted that these methods are equally applicable to any other document preparation use case. The underlying principles and mechanisms of automated user interface generation and interview experience creation are designed to be versatile and adaptable, enabling their application across various domains where document preparation is performed. This adaptability ensures that the disclosed system and method can be employed to streamline and enhance the preparation of a wide array of documents, irrespective of the specific field or industry, thereby broadening the scope and utility of the present disclosure.

Referring now to FIG. 2, a flowchart is depicted outlining an example process 200 for updating a user interface based on tax form changes. The process 200 begins with the completeness graph creation/revision step 202, which initiates the process by creating or revising a completeness graph based on documentation. The completeness graph may represent the informational elements that are relevant for completing the document preparation. In some cases, the completeness graph may be created by a completeness graph generator interpreting current rules for the document preparation. In other cases, the completeness graph may be manually revised based on changes in laws or regulations to maintain an accuracy of the completeness graph. The process may adapt to different locations and laws to align with the completeness graph to provide location-specific and law-specific document preparation guidance.

In other words, the completeness graph serves as a representation of the informational elements that are beneficial for the completion of the document preparation process. This graph is not static but is dynamically created and updated based on the current rules and regulations pertaining to the document preparation. For instance, in the context of tax preparation, the completeness graph may encapsulate the relevant tax-related information that a user would require to accurately complete his/her tax filing. The creation of the completeness graph involves a detailed interpretation of the current rules for document preparation. This interpretation process is designed to extract the relevant informational elements from the rules and represent them in a structured and comprehensible manner in the graph. This ensures that the graph accurately reflects the current requirements of the document preparation process and provides a comprehensive guide for the user. However, as mentioned above, rules and regulations for document preparation are not static and can change over time due to various factors such as changes in laws or regulations. In such cases, the completeness graph is revised to reflect these changes and maintain its accuracy. The revision process involves reinterpreting the updated rules and regulations and updating the graph to include any new informational elements or modify existing ones. This ensures that the graph remains up-to-date and continues to provide accurate guidance for the document preparation process.

The process of creating and revising the completeness graph is designed to adapt to different locations and laws. This means that the graph can be tailored to provide location-specific and law-specific guidance for document preparation. For instance, in the context of tax preparation, the graph can be adapted to reflect the specific tax laws and regulations of a user's location, ensuring that the user is provided with guidance that is relevant and applicable to his/her specific situation. This adaptability enhances the utility of the completeness graph and makes it a versatile tool for guiding users through the document preparation process.

It is noted that updating of the completeness graph is a manual procedure performed by the programmer. For example, in the event of changes to tax forms or laws, the programmer updates the completeness graph to accurately reflect the new requirements. This update may involve removing, adding, or modifying the informational elements within the completeness graph. To update the completeness graph, the programmer may analyze the latest tax documentation to identify any new or altered requirements. This involves a review of the updated tax forms and laws by a subject matter expert to pinpoint specific changes that impact the informational elements. Based on the recommendations of the subject matter expert, the programmer may access the completeness graph's underlying data structure, which could be a database or a structured file, and proceed to make precise modifications. For instance, if a tax form no longer requires a taxpayer's middle name, the programmer would locate the corresponding node or entry in the completeness graph and remove it. Conversely, if a new field, such as a section for reporting virtual currency transactions, is introduced, the programmer would add a new node or entry to the graph. Additionally, the programmer may adjust the relationships or dependencies between various informational elements to reflect the logical flow of the updated tax form. These updates to the completeness graph are performed to ensure that the resultant graph accurately represents the current tax filing requirements and provides a solid foundation for the subsequent automated steps in the user interface generation process.

However, once the programmer has made the appropriate revisions to the completeness graph, the programmer does not have to manually perform other tasks. In other words, the automated system then takes over and automatically updates the field guide, automatically generates a new interview experience, and automatically updates the user interface accordingly. This streamlined process eliminates the manual effort traditionally associated with such updates and ensures that the user interface remains consistent with the latest tax form requirements.

For example, following the creation or revision of the completeness graph, the process proceeds to the field guide creation/revision step 204. This step involves utilizing the completeness graph and LLM to create or revise a field guide. The field guide may include questions to pose to a user for requesting user input for the informational elements for completing the document preparation. The field guide may be aligned with the completeness graph to ensure consistency between the informational elements represented in the completeness graph and the questions posed to the user.

The field guide serves as a tool to facilitate user interaction during the document preparation process. It comprises a set of questions that are designed to solicit user input for the informational elements that are beneficial for completing the document preparation. The questions in the field guide are not arbitrary but are crafted based on the data from the completeness graph. The completeness graph, as mentioned earlier, is a representation of the informational elements that are relevant for the document preparation. It is created by interpreting the current rules for document preparation and can be revised based on changes in laws or regulations. The alignment of the field guide with the completeness graph is a strategic move to ensure consistency and coherence in the document preparation process. This alignment ensures that the questions posed to the user accurately reflect the informational elements represented in the completeness graph. In other words, each question in the field guide corresponds to a specific informational element in the completeness graph. This correlation ensures that the user is asked for the information that is relevant. This alignment also aids in maintaining the integrity of the document preparation process. It ensures that the user is guided through the process in a systematic and logical manner, with each question leading to the next in a coherent sequence. This not just enhances the user experience but also ensures that the final document is complete and accurate, adhering to the relevant rules and regulations.

The autogeneration input step 206 involves inputting the completeness graph, field guide, and metadata into an auto-generation solution. The autogeneration solution may be configured to generate an interview experience using the completeness graph and the field guide. The Autogeneration solution may also be configured to automatically update a user interface code and a resultant user interface screen displayed to the user in response to modifications to the completeness graph and the field guide.

The completeness graph, as previously mentioned, is a representation of the tax calculations, displaying the minimum elements that are mandatory for a tax form versus all the elements that could potentially be included. The field guide, on the other hand, is a set of AI-generated natural language questions designed to help the user fill in the personal/tax information as per the requirements of the completeness graph. The metadata, which is also input into the autogeneration solution, provides additional context and information about the interview. This could include details such as the purpose of each question, the expected type of response, and any dependencies or relationships between different elements of the interview. The metadata is used to enhance the interview experience and to ensure that it is comprehensive and meaningful.

The autogeneration solution, which receives these inputs, is configured to generate an interview experience using the completeness graph and the field guide. This involves using the data from the completeness graph and the field guide to create a sequence of questions and responses that guide the user through the tax filing process. The autogeneration solution uses advanced algorithms and AI techniques to generate this interview experience, ensuring that it is user-friendly and intuitive.

In addition to generating the interview experience, the autogeneration solution is also configured to automatically update the user interface code and the resultant user interface screen in response to modifications to the completeness graph and the field guide. This means that if there are any changes in the tax form requirements, which would be reflected in the completeness graph and the field guide, the autogeneration solution would automatically update the user interface to reflect these changes. This automatic update includes both the underlying code that drives the user interface and the actual user interface screen that is displayed to the user. This ensures that the user interface is consistently updated to reflect the latest tax form requirements, providing a seamless and up-to-date user experience.

In the UI code auto-update step 208, for example, the system automatically updates the user interface code in response to any changes in the completeness graph and the field guide. These changes may be triggered by modifications in the documents used in the document preparation. For instance, if a tax form is updated to no longer require the middle name of the filer, the completeness graph and the field guide would be updated to reflect this change. Consequently, the user interface code would also be updated to align with these changes. The updating of the user interface code involves removing, adding, or modifying user interface elements that correspond to the informational elements in the completeness graph that have been updated. For example, if the middle name attribute is removed from the completeness graph, the corresponding field in the user interface would also be removed. Similarly, if a new attribute is added to the completeness graph, a new field would be added to the user interface. This ensures that the user interface accurately reflects the current requirements of the document preparation and provides a seamless and up-to-date user experience. In other words, the UI code auto-update step 208 ensures that the user interface generation code is consistently updated to reflect the latest requirements of the document preparation. This automatic update, driven by the completeness graph, field guide, and metadata, streamlines the process of maintaining and updating the user interface, reducing the workload on programmers and enhancing the overall user experience.

In the UI screen deployment step 210, the system takes the updated user interface code and uses it to deploy an updated user interface screen. This deployment is triggered in response to a user's request to initiate an interview for document preparation. The updated user interface screen is not just a visual update, but it also reflects the changes made in the underlying user interface code. This ensures that the user interface screen is not just visually appealing, but also functionally up-to-date, providing an accurate and efficient interface for the user to interact with.

The updated user interface screen is designed to provide an updated interview experience that aligns with the updated documents used in the document preparation. This means that the questions, prompts, and instructions presented to the user on the screen are updated to reflect the latest requirements of the documents. This ensures that the user is provided with the correct and up-to-date information, helping them to accurately and efficiently complete his/her document preparation.

The deployment of the updated user interface screen is not a one-time event, but rather, it is a dynamic process that is triggered each time a user initiates an interview for document preparation. This ensures that the user is presented with the latest user interface screen each time he/she starts an interview, providing him/her with an updated user interface experience. This dynamic deployment of the updated user interface screen is a testament to the system's ability to adapt and respond to changes in real-time, providing a seamless and efficient user experience.

FIG. 3 described below serves as a detailed continuation of the process initiated in FIG. 2, focusing on the generation of the user interface for the interview experience. While FIG. 2 outlines the overarching process for updating the user interface based on changes to tax forms, including the creation and revision of the completeness graph and field guide, FIG. 3 delves into the specific steps involved in constructing the user interface itself.

In FIG. 3, an example detailed process 300 is depicted, outlining the specific steps involved in generating a user interface for an interview experience. This process is part of the overall operation of the automated document preparation system, as it directly influences the user's interaction with the system and his/her overall experience.

The process 300 commences with the information elements determination step 302. In this initial step, the system determines the desired informational elements of the interview based on the completeness graph. The completeness graph, as previously discussed, is a visual representation of the informational elements that are relevant for completing the document preparation. It is created by interpreting the current rules for document preparation and can be revised based on changes in laws or regulations to maintain its accuracy. This ensures that the graph accurately reflects the current requirements of the document preparation process and provides a comprehensive guide for the user.

The determination of the desired informational elements from the completeness graph is a process that involves analyzing the structure and content of the graph to identify the specific data points that are pertinent to the document preparation task at hand. The system employs algorithms to traverse the completeness graph, which is often represented as a network of nodes and edges, where each node corresponds to an informational element and the edges denote the relationships or dependencies between these elements. By examining the completeness graph, the system can discern which informational elements are mandatory, which are optional, and how they interrelate, ensuring that the interview experience covers the bases without overwhelming the user with unnecessary queries. Moreover, the system takes into account the dynamic nature of document preparation, where the relevance of informational elements may shift due to regulatory changes or form updates. As such, the system is designed to be responsive to real-time updates to the completeness graph, allowing for the immediate identification and incorporation of new or modified informational elements into the interview process. This real-time adaptability ensures that the interview experience remains current and compliant with the latest document preparation standards, thereby streamlining the user's journey through the document preparation process and enhancing the accuracy and efficiency of the final output.

The process 300 proceeds to the interview questions determination step 304. This step involves determining the interview questions based on the field guide. The field guide is a set of AI-generated natural language questions designed to help the user fill in the personal/tax information as per the requirements of the completeness graph. The field guide is derived from publicly available forms and instructions (e.g., tax forms), and is aligned with the completeness graph to ensure consistency between the informational elements represented in the completeness graph and the questions posed to the user. This alignment ensures that the questions posed to the user accurately reflect the informational elements represented in the completeness graph.

The determination of interview questions from the field guide is a process that utilizes artificial intelligence to translate the structured data of the completeness graph into interactive, natural language queries. The field guide generator employs algorithms to parse the completeness graph and identify the requisite informational elements. It then formulates questions that are not merely direct inquiries but are crafted to elicit the specific user input that corresponds to each element. These questions are designed to be clear and concise, minimizing ambiguity and guiding the user through the document preparation process in a conversational manner. To ensure that the interview questions are relevant and tailored to the user's context, the field guide generator also incorporates metadata, which may include jurisdictional nuances, document-specific terminology, and user-specific data. This metadata informs the phrasing and sequencing of questions, allowing for a dynamic adjustment of the interview flow based on the user's previous responses and the logical progression of the document preparation process. The result is a seamless and adaptive interview experience that efficiently gathers the information pertinent to the document being prepared, while also providing a user-friendly interface that simplifies complex legal and regulatory language into understandable terms.

Process 300 also involves the UI visual elements determination step 306, where the visual elements of the user interface experience are determined based on metadata. The metadata provides additional context and information about the interview, such as the purpose of each question, the expected type of response, and any dependencies or relationships between different elements of the interview. The metadata is used to enhance the interview experience and to ensure that it is comprehensive and meaningful. It provides a richer context for the interview, helping the user understand the purpose and relevance of each question and the expected responses. This not just enhances the user experience but also ensures that the final document is complete and accurate, adhering to the relevant rules and regulations.

In other words, the system identifies and selects the appropriate visual components for the user interface, such as input fields, checkboxes, and dropdown menus, based on the metadata associated with each question in the interview. For instance, if the metadata indicates that a question requires the user to provide a date, the system may determine that a date picker widget is the appropriate visual element to display. This widget not just visually represents the type of response expected but also restricts input to a valid date format, thereby preventing user errors and ensuring data integrity. The metadata-driven approach ensures that each visual element is purposefully chosen to facilitate the accurate collection of user input, while also contributing to a coherent and user-friendly interface.

Process 300 proceeds with the UI generation code creation step 308, where the user interface generation code is created or revised based on the determined informational elements, interview questions, and visual elements. The user interface generation code is the underlying code that drives the user interface of the document preparation software. It is updated in response to updates in the completeness graph and the field guide, with the updates in the completeness graph and the field guide being triggered by changes in the documents used in the document preparation. The updating of the user interface code involves removing, adding, or modifying user interface elements corresponding to the informational elements in the completeness graph that have been updated. This ensures that the user interface accurately reflects the current requirements of the document preparation and provides a seamless and up-to-date user experience. This step encapsulates the core functionality of the automated document preparation system, as it involves the automatic generation of the user interface based on the completeness graph and the field guide. This automation not just saves time and effort for the programmer, but also ensures that the user interface is consistently updated to reflect the latest requirements of the document preparation.

For example, if the completeness graph is revised to include a new informational element, such as a field for cryptocurrency holdings due to updated tax regulations, the user interface generation code is automatically modified to incorporate a corresponding input field in the user interface. This new field may be a dropdown menu allowing users to select the type of cryptocurrency they own. The system adds the relevant code to render this dropdown menu, including options based on the latest tax guidelines. Similarly, if an informational element is removed from the completeness graph, the associated visual element, such as a text box for entering a now-obsolete tax deduction, is removed from the user interface. This ensures that the user interface remains current and eliminates any outdated or unnecessary fields, thereby streamlining the user's experience and maintaining compliance with the latest document preparation standards.

Building upon the foundational steps delineated in FIGS. 2 and 3, FIG. 4 presents the Interview UI generation process 400, which encapsulates the dynamic and interactive aspects of the user interface generation. While FIG. 2 establishes the overarching framework for updating the user interface in response to tax form changes, and FIG. 3 details the creation of the user interface elements, FIG. 4 illustrates the real-time execution of these elements during an actual interview session. This process is part of the user's engagement with the document preparation system, as it orchestrates the sequence of user interface screens that the user encounters, ensuring a coherent and logical progression through the interview experience.

FIG. 4 shows a flowchart of an example Interview UI generation process 400. The process 400 begins with the UI generation code reference step 402, where the UI generation code references the completeness graph, field guide, and metadata to create a UI screen in response to a user request for an interview. This step may involve the use of a completeness graph and a field guide, which are used to automatically generate an interview experience and update the user interface of the tax preparation software. In some cases, the UI generation code reference step 402 may involve the use of a legal focused LLM to interpret and analyze the legal language used in tax laws and regulations. This information can be used to enhance the completeness graph, providing a comprehensive document preparation guidance to the user.

The process 400 proceeds to the next UI screen generation and deployment step 404. This step involves generating and deploying the next UI screen in the sequence of the interview and collecting informational elements input by the user. In some cases, the next UI screen generation and deployment step 404 may involve the use of a natural language model to generate 'help' content for specific tax topics, including explanations, definitions, or instructions related to a particular tax topic. In other cases, the next UI screen generation and deployment step 404 may involve the use of a language model server to process natural language data and communicate with the Interview autogeneration server 106 to facilitate the creation of an interview experience.

The system proceeds to dynamically create the UI screen. This is achieved through a series of automated steps that translate the structured data from the completeness graph and field guide into a live, interactive user interface. The system's UI generation engine utilizes a template-based approach, where predefined UI templates are selected and customized according to the metadata and the informational elements identified in the previous steps.

For instance, consider a scenario where the user is preparing a tax document that now includes a section for reporting income from freelance work. The completeness graph has been updated to include a new node for "Freelance Income," and the field guide has been expanded with questions such as "Please enter the total income earned from freelance work in the past year." The metadata associated with this question might specify that the input is a numerical value representing currency, and it may also include validation rules such as a minimum and maximum allowable amount.

The UI generation engine retrieves a suitable template for a numerical input field and customizes it with the appropriate label, placeholder text, and validation logic based on the metadata. The engine then integrates this customized input field into the overall UI screen layout, ensuring that it is logically placed in the sequence of questions and that it adheres to the visual design standards of the software.

As the user progresses through the interview, the system serves up predetermined UI screens that have been previously generated by the autogeneration solution and are ready for deployment as part of the interview workflow. These screens are determined by a completeness-driven interview process that dynamically controls the sequence of the interview based on the completeness graph. The system effectively integrates custom-authored topics with autogenerated content, creating a hybrid interview experience. The dynamic nature of the interview is managed in real-time by the completeness graph, ensuring that the user is presented with the appropriate screens at each step of the process. It is also noted that in another example, the system may generate the UI screens in real-time during the interview.

The process 400 then reaches the interview completion decision point step 406, where a determination is made whether the interview is complete. If the interview is not complete, the process loops back to the next UI screen generation and deployment step 404. This iterative process continues until certain informational elements have been addressed, and the user has navigated through the complete interview experience. The system's ability to dynamically generate and deploy UI screens in real-time, based on the evolving structure of the completeness graph and field guide, exemplifies the innovative and adaptive nature of the automated document preparation system.

If the interview is complete, the process proceeds to the final document generation step 408, where the generation of document(s) is completed based on the collected informational elements. In some variations, the final document generation step 408 may involve the use of an autogenerating solution to generate the interview experience by using a legal language model to interpret and analyze document preparation legal language of laws and regulations, providing document preparation guidance that is consistent with the legal language of the laws and the regulations.

In some variations, the process 400 may include deploying the updated user interface screen to the user upon execution of the interview experience for the document preparation, the updated user interface screen reflecting the updated user interface code and providing an updated interview experience that aligns with the updated documents used in the document preparation. This variation may provide a more user-friendly and intuitive interface for users of the tax preparation software, ensuring that the user interface is consistently updated to reflect the latest requirements of the tax form.

To further explain the functioning of the disclosed system/method, consider a scenario where the tax form is updated to no longer require the middle name of the filer. The programmer begins by updating the completeness graph to reflect this change. The programmer accesses the data structure of the completeness graph, which could be a database or a structured file, and locates the node or entry corresponding to the middle name attribute. Using a programming interface or a direct database manipulation tool, the programmer removes this node from the graph. This action triggers an event in the system that the middle name attribute is no longer relevant for the document preparation process.

Subsequently, the field guide generator, which relies on the completeness graph, detects the removal of the middle name attribute and confirms the change in the publicly available forms (e.g., tax forms). The generator then automatically updates the field guide, ensuring that no questions related to the middle name are presented to the user and changing questions/labels for other fields if they refer to the middle name. This is achieved through a series of programmed rules and conditions to generate a new field guide, or by scanning the field guide for any instances where the middle name is referenced and revising the field guide by removing these questions. The system may employ natural language processing algorithms to ensure that the removal of the questions does not disrupt the flow or coherence of the interview.

The autogenerating solution then references the updated completeness graph and field guide to automatically update the user interface code by executing a script that scans for UI elements bound to the middle name attribute. Upon finding such elements, the script removes the corresponding code segments, which may involve deleting lines of code or deactivating UI components in a visual editor. This process is facilitated by a mapping system that links the informational elements of the completeness graph to specific UI elements in the codebase.

Once the updated user interface code is compiled, the resultant user interface screen is deployed to the user. The deployment mechanism ensures that the next time a user initiates an interview for document preparation, the middle name field is no longer present. This is managed by the application server, which serves the latest version of the user interface to the user's device. The server may use version control systems to track changes and ensure that users are interacting with the correct version of the interface that corresponds to the updated tax form requirements.

Figure 5:
FIG. 5 is a block diagram of a computing system, according to aspects of the present disclosure.

Referring now to FIG. 5, a block diagram of a computing system 500 is depicted. The computing system 500 may be used to implement the devices of the automated document preparation system 100 shown in FIG. 1. The computing system 500 may include a processor block 502, an input device block 504, a display device block 506, and a network interface block 508, interconnected via a system communication bus 512.

The processor block 502 may serve as the central processing unit of the computing system 500, executing instructions and managing the flow of information between the various components. In some cases, the processor block 502 may be configured to execute the tax preparation software code, interpret and translate the complex calculations involved in tax preparation into a visual representation, known as a completeness graph, and generate the interview experience in Fuego.

The input device block 504 may allow for user input to be received. In some aspects, the input device block 504 may be configured to receive user input for the informational elements for completing the document preparation. The user input may be received in response to the questions posed to the user during the interview experience.

The display device block 506 may enable visual output to be presented to the user. In some cases, the display device block 506 may be configured to display the user interface screen to the user. The user interface screen may be updated based on the updated user interface code and provide an updated interview experience that aligns with the updated documents used in the document preparation.

The network interface block 508 may facilitate connectivity to other systems and networks. In some aspects, the network interface block 508 may be configured to connect the computing system 500 to the Communication Network 110, enabling the User Device 102 to interact with the other components of the Automated document Preparation System 100.

An operating system block 510 is also connected to the system communication bus 512 and includes an operating system core 514, a network communication module 516, and an applications module 518. The operating system core 514 may manage system resources and provide services to the network communication module 516 and the applications module 518. The network communication module 516 may handle network interactions, while the applications module 518 may run various software applications, including the tax preparation software.

In some variations, the computing system 500 may be configured to adapt to different locations and laws to align with the completeness graph to provide location-specific and law-specific document preparation guidance. In other variations, the computing system 500 may be configured to generate the interview experience by using a legal language model to interpret and analyze document preparation legal language of laws and regulations, providing document preparation guidance that is consistent with the legal language of the laws and the regulations.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A system for automating creation of an interview experience for document preparation, the system comprising:

a completeness graph generator configured to create a completeness graph by interpreting current rules for the document preparation, the completeness graph indicating informational elements for completing the document preparation;

a field guide generator configured to create a field guide using data from the completeness graph, the field guide aligned with the completeness graph and including questions to pose to a user for requesting user input for the informational elements for completing the document preparation; and an autogenerating process configured to generate the interview experience using the completeness graph and the field guide, the autogenerating process automatically updating a user interface code in a codebase and a resultant user interface screen displayed to the user in response to modifications to the completeness graph and the field guide, wherein in response to detecting the modifications to the completeness graph, the autogenerating process utilizes the completeness graph and the field guide to link the informational elements of the completeness graph to specific UI elements in the codebase, automatically scans for UI elements bound to modified informational elements, and automatically modifies corresponding code segments of the specific UI elements to generate and deploy updated user interface code.

2. The system of claim 1, wherein the completeness graph generator is further configured to revise document preparation calculations based on changes in laws or regulations to maintain an accuracy of the completeness graph.

3. The system of claim 1, wherein the field guide generator is further configured to generate the questions as natural language questions for the user to collect the informational elements in a user-friendly manner.

4. The system of claim 1, wherein the system is further configured to adapt to different locations and laws to align with the completeness graph to provide location-specific and law-specific document preparation guidance.

5. The system of claim 1, wherein the autogenerating process is further configured to update the user interface code and the resultant user interface screen based on changes in document preparation forms to such that the user interface reflects current requirements of the forms.

6. The system of claim 1, wherein the autogenerating process is further configured to generate the interview experience by using a legal language model to interpret and analyze document preparation legal language of laws and regulations to provide document preparation guidance that is consistent with the legal language of the laws and the regulations.

7. The system of claim 1, wherein the autogenerating process is further configured to generate the interview experience in using a legal language model to interpret and analyze legal language used in laws and regulations, and to enhance the completeness graph based on this interpretation and analysis to provide a comprehensive document preparation guidance to the user.

8. The system of claim 1, wherein the autogenerating process is further configured to update the user interface code in response to updates in the completeness graph and the field guide, the updates in the completeness graph and the field guide being triggered by changes in the documents used in the document preparation.

9. The system of claim 8, wherein the autogenerating process is further configured to update the user interface code by removing, adding, or modifying user interface elements corresponding to the informational elements in the completeness graph that have been updated, thereby reflecting the changes in the documents used in the document preparation.

10. The system of claim 9, wherein the autogenerating process is further configured to deploy the updated user interface screen to the user upon execution of the interview experience for the document preparation, the updated user interface screen reflecting the updated user interface code and providing an updated interview experience that aligns with the updated documents used in the document preparation.

11. A method for automating creation of an interview experience for document preparation, the method comprising:

creating, by a completeness graph generator, a completeness graph by interpreting current rules for the document preparation, the completeness graph indicating informational elements for completing the document preparation;

creating, by a field guide generator, a field guide using data from the completeness graph, the field guide aligned with the completeness graph and including questions to pose to a user for requesting user input for the informational elements for completing the document preparation; and generating, by an autogenerating process, the interview experience using the completeness graph and the field guide, the autogenerating process automatically updating a user interface code in a codebase and a resultant user interface screen displayed to the user in response to modifications to the completeness graph and the field guide, wherein in response to detecting the modifications to the completeness graph, the autogenerating process utilizes the completeness graph and the field guide to link the informational elements of the completeness graph to specific UI elements in the codebase, automatically scans for UI elements bound to modified informational elements, and automatically modifies corresponding code segments of the specific UI elements to generate and deploy updated user interface code.

12. The method of claim 11, further comprising:
revising, by the completeness graph generator, document preparation calculations based on changes in laws or regulations to maintain an accuracy of the completeness graph.

13. The method of claim 11, further comprising:
generating, by the field guide generator, the questions as natural language questions for the user to collect the informational elements in a user-friendly manner.

14. The method of claim 11, further comprising:
adapting, by the method, to different locations and laws to align with the completeness graph to provide location-specific and law-specific document preparation guidance.

15. The method of claim 11, further comprising:
updating, by the autogenerating process, the user interface code and the resultant user interface screen based on changes in document preparation forms to such that the user interface reflects current requirements of the forms.

16. The method of claim 11, further comprising:
generating, by the autogenerating process, the interview experience by using a legal language model to interpret and analyze document preparation legal language of laws and regulations to provide document preparation guidance that is consistent with the legal language of the laws and the regulations.

17. The method of claim 11, further comprising:
generating, by the autogenerating process, the interview experience in using a legal language model to interpret and analyze legal language used in laws and regulations, and to enhance the completeness graph based on this interpretation and analysis to provide a comprehensive document preparation guidance to the user.

18. The method of claim 11, further comprising:
updating, by the autogenerating process, the user interface code in response to updates in the completeness graph and the field guide, the updates in the completeness graph and the field guide being triggered by changes in the documents used in the document preparation.

19. The method of claim 18, further comprising:
updating, by the autogenerating process, the user interface code by removing, adding, or modifying user interface elements corresponding to the informational elements in the completeness graph that have been updated, thereby reflecting the changes in the documents used in the document preparation.

20. The method of claim 19, further comprising:
deploying, by the autogenerating process, the updated user interface screen to the user upon execution of the interview experience for the document preparation, the updated user interface screen reflecting the updated user interface code and providing an updated interview experience that aligns with the updated documents used in the document preparation.

* * * * *